United States Patent [19]
O'Sullivan et al.

[11] Patent Number: 5,636,301
[45] Date of Patent: Jun. 3, 1997

[54] OPTICAL WAVEGUIDE AMPLIFIERS

[75] Inventors: Maurice O'Sullivan, Ottawa, Canada; Jonathan P. King, Epping, United Kingdom; Andrew N. Robinson, Richardson, Tex.

[73] Assignee: Northern Telecom Limited, Montreal, Canada

[21] Appl. No.: 457,983

[22] Filed: Jun. 1, 1995

[30] Foreign Application Priority Data

Jun. 2, 1994 [GB] United Kingdom .................. 9411061

[51] Int. Cl.$^6$ .................................................. H01S 3/07
[52] U.S. Cl. ................................. 385/24; 385/27; 385/37
[58] Field of Search ............................ 385/24, 37, 27; 359/341

[56] References Cited

U.S. PATENT DOCUMENTS

| | | | |
|---|---|---|---|
| 5,048,909 | 9/1991 | Henry et al. | 385/27 |
| 5,187,760 | 2/1993 | Huber | 385/37 |
| 5,225,922 | 7/1993 | Chraplyvy et al. | 359/124 |
| 5,283,686 | 2/1994 | Huber | 359/337 |
| 5,410,624 | 4/1995 | Morkel | 385/24 |
| 5,434,702 | 7/1995 | Byron | 359/341 |

FOREIGN PATENT DOCUMENTS

| | | |
|---|---|---|
| 2 265 059 | 9/1953 | United Kingdom . |
| 2 246 234 | 1/1992 | United Kingdom . |
| 2 265 751 | 10/1993 | United Kingdom . |

OTHER PUBLICATIONS

Agrawal and Dutta, Semiconductor Lasers, Van Nostrand Reinhold, New York, pp. 319–321. 1993.

da Silva, "Automatic Gain Flattening In Optical Fiber Amplifiers Via Clamping of Inhomogeneous Gain", IEEE Photonics Tech. Letters, vol. 4, No. 3, Apr. 1993, pp. 412–414.

Elrefaie, "Fiber–Amplifier Cascades with Gain Equalization In Multiwavelength Unidirectional Inter–Office Ring Networks", IEEE Photonics Tech. Letters, vol. 5, No. 9, Sep. 1993, pp. 1026–1028.

Goldstein, "Multiwavelength fiber—amplifier cascades for networks", OFC '94 Technical Digest, p. 39, 1994 (no month available).

Kashyap, "Wideband Gain Flattened Erbium Fibre Amplifier Using A Photosensitive Fibre Blazed Grating", Electronics Letters, vol. 29, No. 2, Jan. 21, 1993, pp. 154–156.

Kashyap, "Wavelength Flattened Saturated Erbium Amplifier Using Multiple Side–Tap Bragg Gratings", Electronics Letters, vol. 29, No. 11, May 27, 1995, pp. 1025–1026.

*Primary Examiner*—Rodney B. Bovernick
*Assistant Examiner*—Yisun Song
*Attorney, Agent, or Firm*—Lee, Mann, Smith, McWilliams, Sweeney & Ohlson

[57] ABSTRACT

An optical amplifier for use in a WDM transmission system has a circulator two of whose ports constitute the input and output ports of the amplifier, and to whose third port is connected an optically amplifying fibre. Bragg grating reflectors are formed at specific intervals along this fibre chosen such that each WDM channel is reflected back to the circulator at a distance in inverse proportion to the gain per unit length experienced by that channel in the amplifier fibre, whereby all channels are amplified by the amplifier to the same extent.

16 Claims, 4 Drawing Sheets

OPTICAL WAVEGUIDE AMPLIFIERS

BACKGROUND TO THE INVENTION

This invention relates to optical waveguide amplifiers, and is particularly concerned with a design of such amplifiers affording the possibility of equalising the gain of such an amplifier at specific wavelengths within the amplification band, those specific wavelengths being ones that individually register with the different wavelengths of a wavelength division multiplexed (WDM) system in which that amplifier is incorporated. In such a system differential amplification is generally to be deprecated because, if the system has a cascade of substantially identical amplifiers, then the differential amplification of the system is equal to the differential amplification of an individual amplifier multiplied by the number of amplifiers in the cascade.

A number of methods have been devised for attempting gain equalisation in an optical WDM system. These include using transmission filters placed within the amplifier, as for instance described by M. Tachbana et al., in a conference paper, paper MD1 of the publication 'Optical Amplifiers and their Applications' Vol., 3, (1990). In this method, loss is introduced into each amplifier to reduce the gain in certain spectral regions by the use of an equalising filter. It is thus seen that such equalisation is achieved at the expense of slightly lower pump efficiency. Moreover extra expense and complexity has been introduced into the amplifier design in order for pumping of the amplifier to be arranged to occur in active regions of the amplifier on either side of the equalising filter.

The use of blazed Bragg fibre gratings as transmission filters for this purpose is described in two papers by R. Kashyap et al., respectively entitled 'Wideband Gain Flattened Erbium Fibre Amplifier Using a Photosensitive fibre Blazed Grating', Electronics Letters 21 Jan. 1993, Vol. 29, No. 2, pp 154–6, and 'Wavelength Flattened Saturated Erbium Amplifier Using Multiple Side-Top Bragg Gratings', Electronics Letters 27 May 1993, Vol. 29, No. 11, pp 1025–6.

An alternative method of gain equalisation, that has for instance been described by A. F. Elrefaie et al., IEEE Photonics Tech. Lett., Vol. 15, No. 9, 1026–8 (1993), demultiplexes the signal, uses separate variable optical attenuators for each channel, and then remultiplexes them. Not only is this method lossy and expensive, it also is prone to problems of multipath noise.

A third gain equalisation method, that has for instance been described by V. L. daSilva et al., IEEE Photonics Tech. Lett., Vol. 5, No.4, pp 412–4(1993), and by B. Clesca et al., Post Deadline paper 20, Optical Fibre Conference 1994, utilises gain saturation in an inhomogenously broadened amplifier. In this method the amplifier medium is rendered inhomogenous by selecting a special glass composition, or by cooling the amplifier or by fibre waveguide design. This method has been demonstrated in principle, but in practice uses an unreliable glass composition (ZBLAN) or requires too low a temperature (−200° C.) or has limited applicability.

Some limited measure of equalisation can be achieved by operating different amplifiers in the cascade under different conditions chosen so that some exhibit an spectral gain characteristic that has a positive slope, while others exhibit a negative slope characteristic. This method is for instance described in the conference paper by M Tachbana et al. to which previous reference has been made, and in a conference paper by E Goldstein, Tu 14, OFC 1994. A drawback of this method is that in a erbium amplifier it is applicable to pumping at 980 nm, but not for amplifiers pumped at 1480 nm.

Finally it may be mentioned that the problems attributable to lack of gain equalisation can be reduced by severely restricting the full spectral range of the multiplexed channels, but this is inherently a sub-optimal approach to resolving the problem.

SUMMARY OF THE INVENTION

The present invention is directed to a new method of differential gain adjustment equalisation that avoids some of the disadvantages of the prior art. This method involves the use of an optical circulator. For the purposes of this specification the term optical circulator is defined to mean not only a three-pod Y-junction optically non-reciprocal device, but also an optically non-reciprocal four-port device such as one comprising a 2×2 3 dB coupler provided with an optical isolator in one of its arms.

According to the present invention there is provided an optical waveguide amplifier, which amplifier includes an optical circulator having input, intermediate and output ports, wherein the input port is optically coupled non-reciprocally to the intermediate port and the intermediate port is optically coupled to the output port, wherein the input and output ports of the circulator respectively constitute input and output ports of the amplifier, and wherein a length of optical amplifier waveguide is optically coupled with the intermediate port of the circulator, which amplifier waveguide is provided with a plurality of spectrally selective reflectors optically in series in a manner providing active sections of the optical amplifier waveguide lying between consecutive pairs of said reflectors, wherein the reflection bands of the reflectors are spectrally separated by intervening guard bands.

The invention also provides a wavelength division multiplexed (WDM) transmission system having a plurality of optical amplifiers optically in series, of which at least one optical amplifier is of a construction in which the WDM signal input thereto is directed from an optical circulator into one end of a length of optical amplifier waveguide, wherein different wavelength components of the signal are reflected at different distances along the amplifier waveguide from the circulator, whereby said components are amplified in a ratio that is different from the ratio of the gains per unit length of the amplifier waveguide afforded to said wavelength components.

The invention further provides a method of optically amplifying a set of wavelength division multiplexed signal channels, said set consisting of a set of mutually exclusive sub-sets, each of at least one signal channel, wherein different members of the set of subsets of channel are caused to propagate for different distances along a length of optically amplifying waveguide common to all members of the set from one end of the optically amplifying waveguide before being reflected back to said one end at different ones of a set of spectrally selective reflectors.

An optical waveguide amplifier according to the present invention bears superficial resemblance to the optical pulse regenerator described in GB-B 2 265 059 that reshapes, amplifies and spectrally narrows optical pulses. Thus both devices have a circulator and a length of optically amplifying waveguide in which are formed a set of Bragg reflection gratings. However the problems tackled by the two devices are quite different. GB-B 2 265 059 is concerned with reducing chirp-related pulse-spreading in a single channel optically amplified optical transmission system, this chirp resulting from the necessarily finite spectral width of the single channel in conjunction with chromatic dispersion in the transmission system, whereas the present invention is specifically concerned, not with the effects of chromatic dispersion, but with cumulative differential amplification effects occurring in wavelength division multiplexed systems employing optical amplifiers in cascade.

It may be noted that the amplifying waveguide can be optically pumped from the end optically remote from the circulator without having to have recourse to the use of a wavelength multiplexing coupler. Preferably, but not necessarily, the amplifying waveguide is optical fibre waveguide, and the reflectors are Bragg grating reflectors constructed in the amplifying waveguide. In the case of an amplifier having an amplifying optical fibre waveguide with Bragg grating reflectors, this amplifying optical fibre waveguide may have a single uninterrupted active region extending from a point at or near the circulator to a point at or beyond the most distant of the reflectors.

The different distances may be chosen to make the amplifier provide the same measure of gain for each channel (gain equalisation). Alternatively they may be chosen to provide specific differential amplification, for instance to compensate differential losses occurring elsewhere in the system.

BRIEF DESCRIPTION OF THE DRAWINGS

There follows a description of an amplifier embodying the present invention in a preferred form. The description refers to the accompanying drawings, in which.

DETAILED DESCRIPTION OF THE PREFERRED EMBODIMENT

The amplifier now to be described has been designed for use in a WDM transmission system having a transmitter and a receiver linked by an optical transmission path that includes a set of optical amplifiers spaced out at intervals down that path. The full spectral range of the multiplexed channels of the system embraces regions of significantly different values of gain per unit length of the active amplifying medium of the amplifier, and to some form of gain equalisation is required. For convenience of illustration, the drawings represent the situation in respect of an amplifier for a WDM system that has only five multiplexed channels. In practice the amplifier would normally be designed for use in a WDM system that has a larger number of channels, though fewer could alternatively be used.

Figure 1:
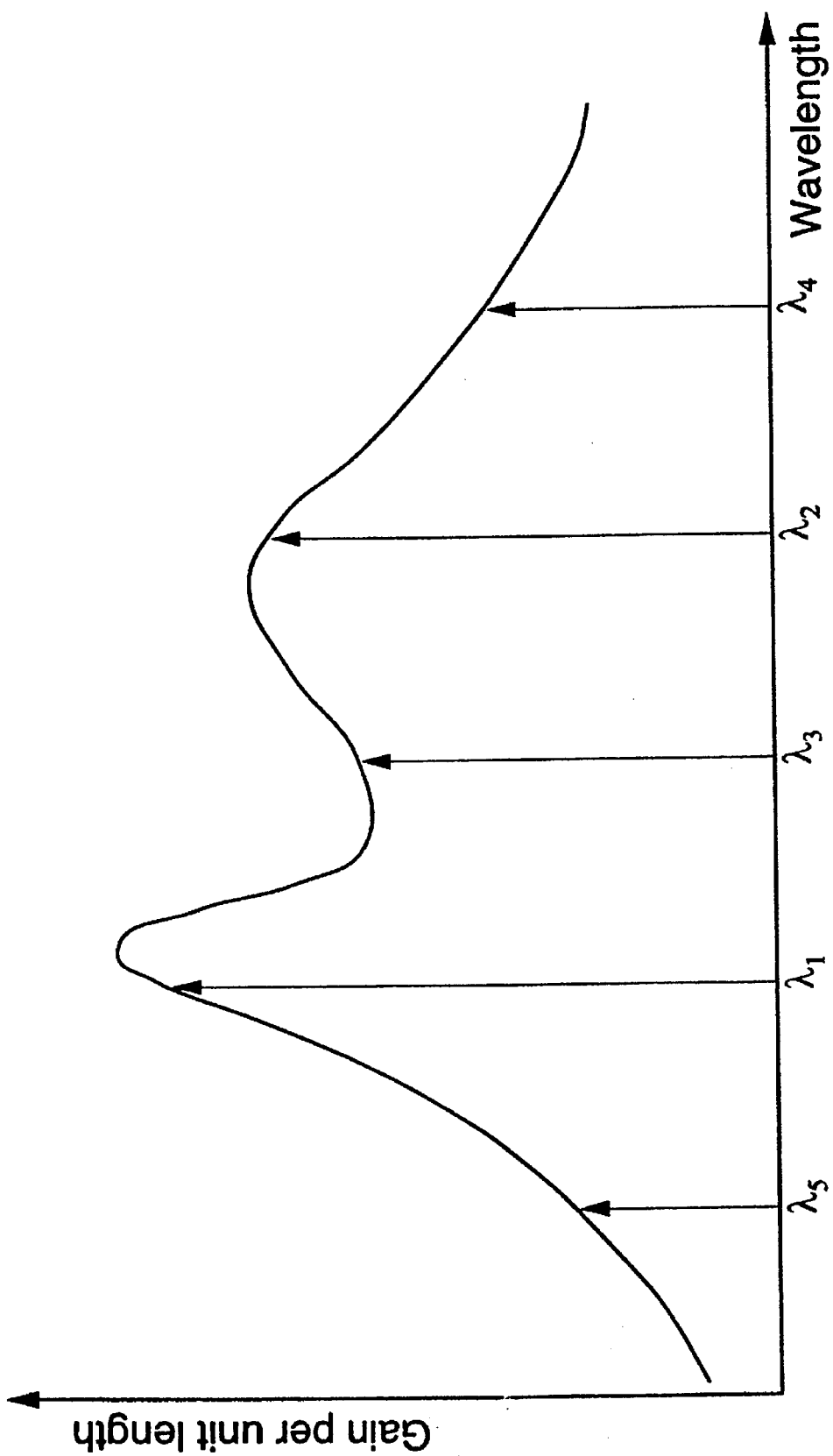
FIG. 1 is a representation of the gain per unit length of active optically amplifying fibre measured, under its operating conditions, as a function of wavelength.

FIG. 1 shows the spectral variation in gain per unit length of the amplifying medium employed in the amplifier. The particular shape of characteristic illustrated in FIG. 1 is presented merely for the purpose of illustrating the principles by which gain equalisation is achieved. Also plotted on FIG. 1 are the wavelengths $\lambda_1$ to $\lambda_5$ of the five channels of the WDM system. These channels have been ranked in descending order of gain per unit length of the amplifying medium of the amplifier. Thus the channel at $\lambda_1$ is the channel most strongly amplified, while the channel at $\lambda_5$ is the one that is least strongly amplified.

Figure 2:
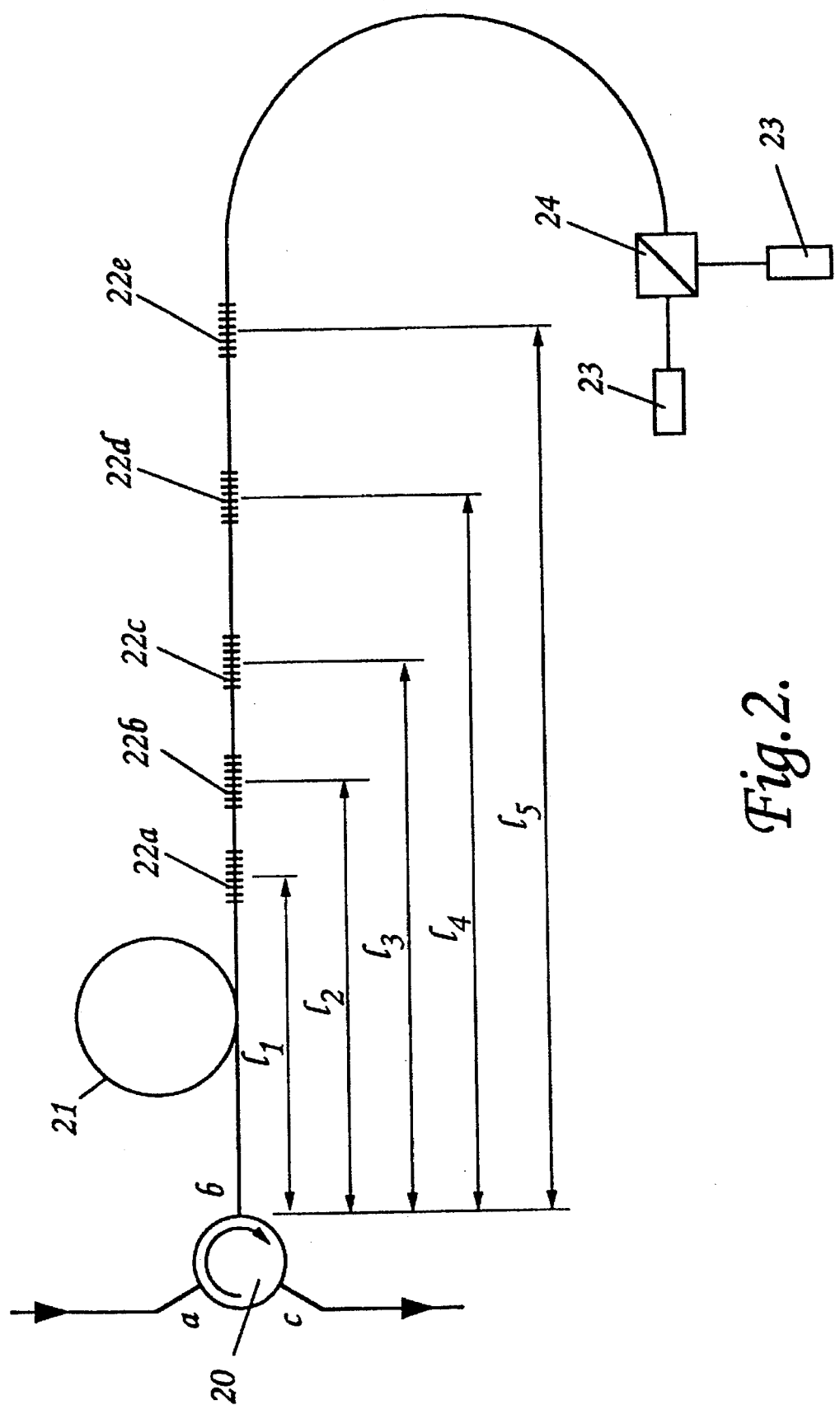
FIG. 2 is a schematic diagram of an amplifier constructed using amplifying optical fibre waveguide having an active region with the spectral characteristics as set out in FIG. 1.

Referring now to FIG. 2, the amplifier comprises an optical circulator 20 with three ports 'a', 'b' and 'c'. Ports 'a' and 'c' respectively form the input and output ports of the amplifier. Optically coupled with port 'b' is a length 21 of amplifying optical fibre waveguide, typically erbium doped optical fibre. Near the end of the amplifier fibre 21 that is optically remote from the circulator 20 is a set of five spectrally selective reflectors constituted by photo-induced Bragg gratings 22a to 22e respectively reflecting at wavelengths $\lambda_1$ to $\lambda_5$ and located at distances $l_1$ to $l_5$ from the end of the amplifier fibre 21 adjacent the circulator.

The distances $l_1$ to $l_5$ are chosen so that they are in inverse proportion to the gain per unit length of fibre 21 at the respective reflection wavelengths of the respective reflectors 22. Accordingly the component at wavelength $\lambda_1$ of a signal applied to the input port 'a' of circulator 10 makes a double pass of length $l_1$ through the amplifier fibre before leaving the amplifier by way of port 'c' of circulator 10, whereas the component at wavelength $\lambda_1$ makes a double pass of length $l_2$, but both components are thereby amplified to the same degree because of the greater amplification per unit length experienced by the $\lambda_1$ wavelength component. A corresponding situation is similarly presented in relation to all the other pairs of wavelength components of the input signal.

Normally a wavelength multiplexing coupler is employed to couple light from an optical pump into amplifier but, with this 'folded' design of amplifier fibre configuration, the requirement to use such a wavelength multiplexing coupler is avoided since the pump power can be coupled directly into the end of the amplifier fibre 21 remote from the circulator 20. In the particular instance of the amplifier of FIG. 2, two optical pumps 23 are provided whose emissions are combined using a polarisation beam splitter 24.

It is not necessary to use Bragg reflectors for the spectrally selective reflectors 22, but one of the advantages of doing so is that it affords the possibility of employing the same Bragg grating writing set-up to write an individual spectrally selective reflector for an amplifier, as is also used to write at least one of a pair of cavity defining reflectors of a fibre laser of matched emission wavelength.

In this context, it will be observed that no pair of the spectrally selective reflectors of an amplifier should co-operate to constitute a laser cavity, and hence, at least within the spectral gain range of the amplifying waveguide, the individual reflectors should be spaced in wavelength sufficiently to leave an adequate wavelength guard band between spectrally adjacent reflectors.

Another advantage of using Bragg reflectors for the spectrally selective reflectors of an amplifier is that such a reflector may be chirped so as to provide a measure of dispersion for the light that is reflected by it. Such dispersion can be tailored to compensate in part or in total for a source of dispersion occurring elsewhere in the system.

In the foregoing description it has been assumed that a single channel is associated with each of the wavelengths $\lambda_1$ to $\lambda_5$, but it should be understood that the reflectors 22 have finite reflection bandwidths, and so any individual reflector 22, such as reflector 22b, can be constructed to reflect not just a single channel, in this instance a channel centred on $\lambda_2$, but a subset of channels, in this instance a subset centred on $\lambda_2$.

Figure 3:
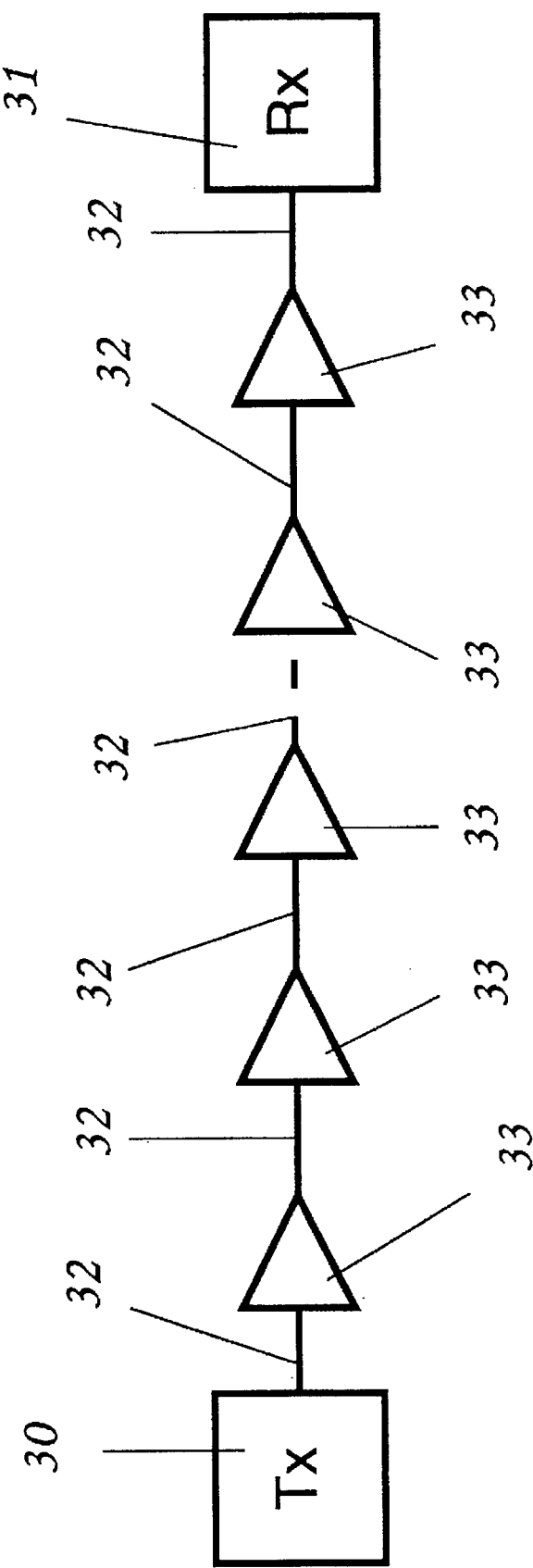
FIG. 3 is a schematic diagram of a WDM transmission system that includes a set of the amplifiers of FIG. 2 in the transmission path between an optical transmitter and an optical receiver.

Previous reference has been made to the fact that the amplifier of FIG. 2 has been designed for use in WDM transmission having a transmitter and a receiver linked by an optical transmission path that includes a set of amplifiers spaced out at intervals down that path. Such a system is depicted in FIG. 3 in which a transmitter 30 and a receiver 31 are linked by a transmission path 32 that includes a set of amplifiers 33, each as described above with reference to FIG. 2.

Figure 4:
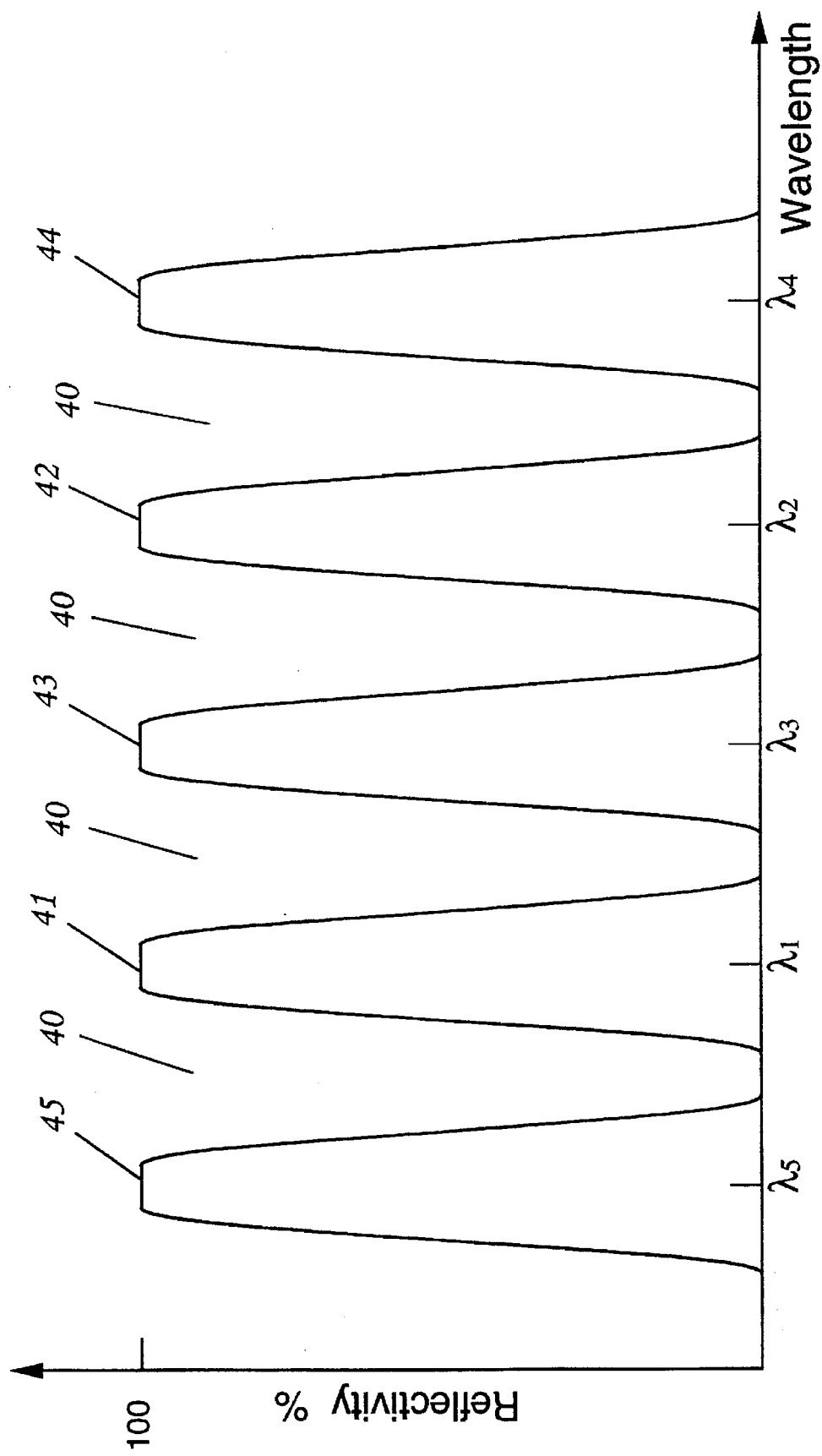
FIG. 4 is a spectral diagram showing the intervening guard bands separating the spectral reflection bands of the reflectors of the amplifier of FIG. 2.

FIG. 4 depicts the spectral relationship between the reflection bands 41, 42, 43, 44 and 45 centered respectively on wavelength $\lambda_1$ to $\lambda_5$ and provided respectively by reflectors 22a to 22e. In particular it is seen from this figure that these spectral reflection bands are individually separated from each other by intervening spectral guard bands 40.

We claim:

1. An optical waveguide amplifier, which amplifier includes an optical circulator having input, intermediate and output ports, wherein the input port is optically coupled non-reciprocally to the intermediate port and the intermediate port is optically coupled to the output port, wherein the input and output ports of the circulator respectively constitute input and output ports of the amplifier, and wherein a length of optical amplifier waveguide is optically coupled with the intermediate port of the circulator, which amplifier waveguide is provided with a plurality of spectrally selective reflectors optically in series in a manner providing active sections of the optical amplifier waveguide lying between consecutive pairs of said reflectors, wherein the reflection bands of the reflectors are spectrally separated by intervening guard bands.

2. An optical amplifier as claimed in claim 1, wherein the spectrally selective reflectors are Bragg grating reflectors.

3. An optical amplifier as claimed in claim 2, wherein the Bragg grating reflectors are chirped Bragg grating reflectors.

4. An optical amplifier as claimed in claim 2, wherein the Bragg grating reflectors are formed in a single continuous length of active optical amplifier waveguide.

5. An optical amplifier as claimed in claim 1, wherein the optical amplifier waveguide is optically pumped from its end optically remote from the circulator.

6. An optical amplifier as claimed in claim 1, wherein the optical amplifier waveguide is an optical fibre amplifier waveguide.

7. A wavelength division multiplexed (WDM) transmission system having a plurality of optical amplifiers optically in series, of which at least one optical amplifier is of a construction in which the WDM signal input thereto is directed from an optical circulator into one end of a length of optical amplifier waveguide, wherein different wavelength components of the signal are reflected at different distances along the amplifier waveguide from the circulator, whereby said components are amplified in a ratio that is different from the ratio of the gains per unit length of the amplifier waveguide afforded to said wavelength components which components are spectrally separated by intervening guard bands.

8. A WDM transmission system as claimed in claim 7, wherein said different distances are chosen such that said wavelength components are substantially equally amplified by said optical amplifier.

9. A WDM transmission system as claimed in claim 8, wherein said different wavelength components are reflected at said different distances by means of Bragg grating reflectors.

10. A WDM transmission system as claimed in claim 9, wherein said Bragg grating reflectors are chirped Bragg grating reflectors.

11. A WDM transmission system as claimed in claim 9, wherein the Bragg grating reflectors are formed in a single continuous length of active optical amplifier waveguide.

12. A WDM transmission system as claimed in claim 9, and including at least one optical source in the form of a laser having a pair of reflectors defining its optical cavity at least one member of which pair is a Bragg grating reflector substantially identical with one of the Bragg grating reflectors of said at least one optical amplifier.

13. A WDM transmission system as claimed in claim 7, wherein the optical amplifier waveguide is optically pumped from its end optically remote from the circulator.

14. A WDM transmission system as claimed in claim 7, wherein the optical amplifier waveguide is an optical fibre amplifier waveguide.

15. A method of optically amplifying a set of wavelength division multiplexed signal channels, said set consisting of a set of mutually exclusive sub-sets, each of at least one signal channel, wherein different members of the set of subsets of channels are caused to propagate for different distances along a length of optically amplifying waveguide common to all members of the set from one end of the optically amplifying waveguide before being reflected back to said one end at different ones of a set of spectrally selective reflectors having reflective wavebands that are spectrally separated by intervening spectral guard bands.

16. A method as claimed in claim 15, wherein the optically amplifying waveguide is optically pumped from its end optically remote from said one end.

* * * * *